(12) United States Patent
Nakayama et al.

(10) Patent No.: US 12,246,652 B2
(45) Date of Patent: Mar. 11, 2025

(54) VEHICLE BODY STRUCTURE

(71) Applicant: HONDA MOTOR CO., LTD., Tokyo (JP)

(72) Inventors: Shingo Nakayama, Tokyo (JP); Kouya Sugawara, Tokyo (JP); Satoshi Yoshihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 18/056,319

(22) Filed: Nov. 17, 2022

(65) Prior Publication Data

US 2023/0202404 A1 Jun. 29, 2023

(30) Foreign Application Priority Data

Dec. 23, 2021 (JP) .................................. 2021-208877
May 20, 2022 (JP) .................................. 2022-082780

(51) Int. Cl.
*B60R 11/00* (2006.01)
*B60R 13/04* (2006.01)
*G01S 13/931* (2020.01)

(52) U.S. Cl.
CPC ............. *B60R 11/00* (2013.01); *B60R 13/04* (2013.01); *B60R 2011/004* (2013.01); *G01S 2013/93271* (2020.01)

(58) Field of Classification Search
CPC . B60R 2011/004; B60R 13/005; B60R 13/04; B60R 19/52; B60R 2019/525; B60R 2019/527; G01S 2013/9327; G01S 2013/93271; G01S 2013/93272; G01S 2013/93274; G01S 2013/93275; H01Q 1/3283
See application file for complete search history.

(56) References Cited

U.S. PATENT DOCUMENTS

| | | | | |
|---|---|---|---|---|
| 2016/0280154 | A1* | 9/2016 | Koda | B60R 13/06 |
| 2018/0290612 | A1* | 10/2018 | Ikeno | H01Q 1/3283 |
| 2019/0232886 | A1* | 8/2019 | Okumura | H01Q 1/422 |
| 2019/0256009 | A1* | 8/2019 | Miwa | G01S 13/931 |
| 2020/0172020 | A1* | 6/2020 | Nakayama | G01S 13/931 |
| 2020/0264267 | A1* | 8/2020 | Gligor | B60R 11/00 |
| 2020/0361398 | A1* | 11/2020 | Nakajima | B60R 11/04 |

(Continued)

FOREIGN PATENT DOCUMENTS

JP  2021-025849 A  2/2021

*Primary Examiner* — Gregory A Blankenship
(74) *Attorney, Agent, or Firm* — Armstrong Teasdale LLP

(57) ABSTRACT

A vehicle body structure includes a garnish provided on an outer side of a vehicle, an adapter joined to the garnish, a radar device supported by the adapter, and a cover joined to the garnish and covering the radar device. The garnish includes a mounting hole, a first annular rib extending to surround the mounting hole, and an annular surface defined by an edge part of the mounting hole and the first annular rib. The adapter is joined to a back side of the garnish in a position corresponding to the mounting hole. The cover includes a plate-shaped portion that is disposed inside the first annular rib, has an outer edge portion opposing an inner side surface of the first annular rib via a first clearance, and covers the mounting hole, and restriction walls protruding from a back side of the plate-shaped portion toward the annular surface.

8 Claims, 13 Drawing Sheets

(56) References Cited

U.S. PATENT DOCUMENTS

| | | | |
|---|---|---|---|
| 2022/0137229 A1* | 5/2022 | Hirose | G01S 7/4811 |
| | | | 250/338.1 |
| 2023/0110608 A1* | 4/2023 | Matori | B60R 19/18 |
| | | | 293/120 |
| 2023/0202404 A1* | 6/2023 | Nakayama | G01S 7/027 |
| | | | 296/1.08 |
| 2023/0204761 A1* | 6/2023 | Inoue | G01S 7/027 |
| | | | 342/27 |
| 2023/0311800 A1* | 10/2023 | Fujii | B60R 19/52 |
| | | | 293/115 |

* cited by examiner

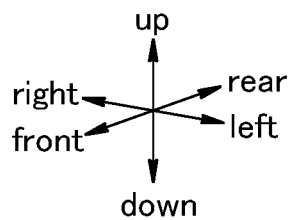
*Fig.2*
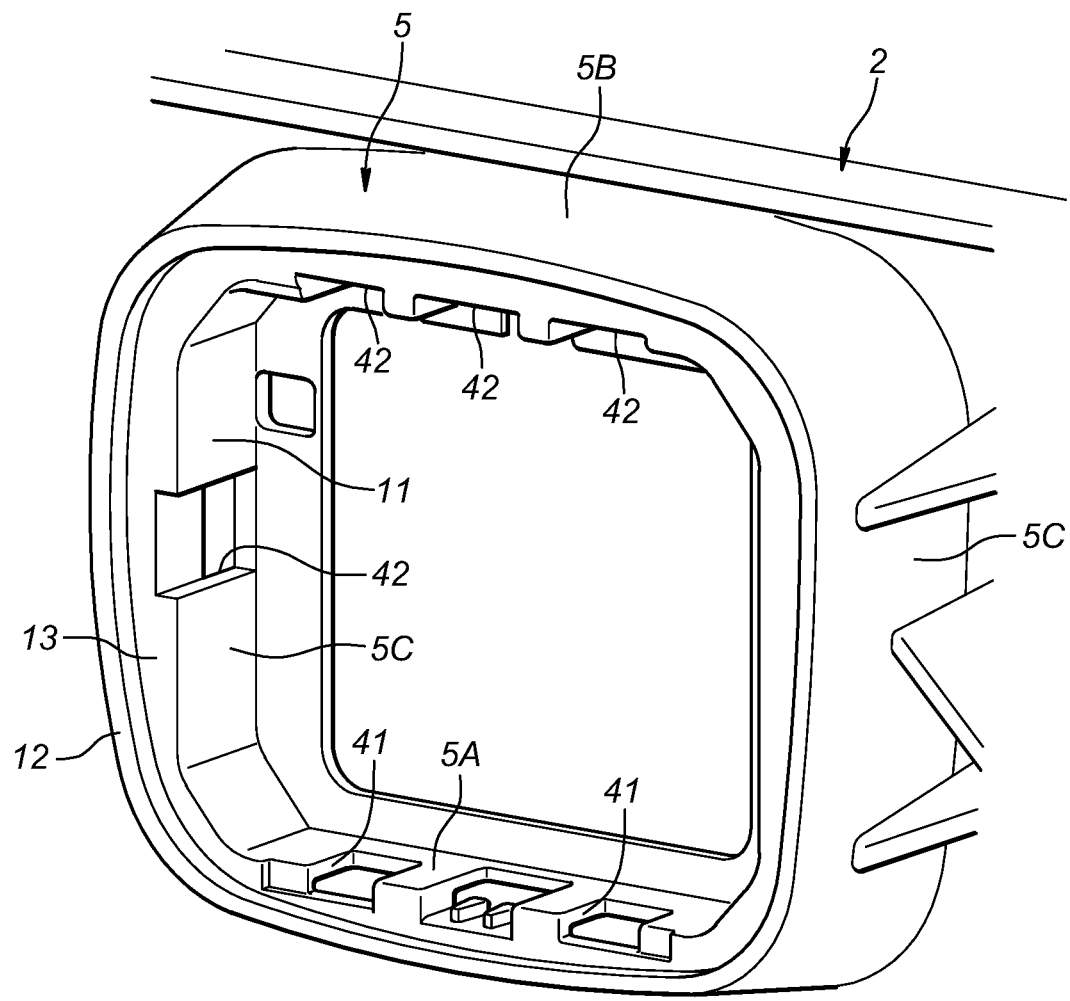

VEHICLE BODY STRUCTURE

TECHNICAL FIELD

The present invention relates to a vehicle body structure.

BACKGROUND ART

Conventionally, vehicles provided with a radar device to detect objects such as other vehicles and buildings present around the own vehicle are known. For example, JP2021-025849A discloses a vehicle body structure including a bracket mounted on a front end portion of a vehicle body frame, a radar device supported on the bracket, and a cover that covers a front side of the radar device. An emblem is formed on the front surface of the cover. The radar device is disposed in a mounting hole formed in the front grille (garnish). The cover is fitted in the mounting hole and is disposed in front of the radar device.

Since the garnish and the cover have manufacturing errors, it is difficult to completely eliminate the gap between the cover and the mounting hole of the garnish. Therefore, to improve the design of the garnish and the cover, sometimes a clearance is intentionally provided between the cover and the mounting hole of the garnish. However, when a clearance is provided between the cover and the mounting hole of the garnish, there is a problem that foreign matters such as snow and dust may intrude through the clearance and may adhere to the radar device.

SUMMARY OF THE INVENTION

In view of the foregoing background, a primary object of the present invention is to provide a vehicle body structure capable of suppressing intrusion of foreign matters while providing a clearance is between the garnish and the cover.

To achieve the above object, one aspect of the present invention provides a vehicle body structure (1), comprising: a garnish (2) provided on an outer side of a vehicle; an adapter (7) joined to the garnish; a radar device (4) supported by the adapter; and a cover (8) joined to the garnish and covering the radar device, wherein the garnish comprises: an outer surface; a mounting hole (11) penetrating therethrough from the outer surface to an inner surface; a first annular rib (12) protruding from the outer surface and extending to surround the mounting hole; and an annular surface (13) defined in the outer surface by an edge part of the mounting hole and the first annular rib, wherein the adapter is joined to a back side of the garnish and is disposed in a position corresponding to the mounting hole, wherein the radar device is disposed in a position corresponding to the mounting hole, and wherein the cover comprises: a plate-shaped portion (37) that is disposed inside the first annular rib, has an outer edge portion opposing an inner side surface of the first annular rib via a first clearance (C1), and covers the mounting hole; multiple restriction walls (44) protruding from a back side of the plate-shaped portion toward the annular surface; and a locking claw (38, 39) protruding from the back side of the plate-shaped portion toward the mounting hole to be locked by the edge part of the mounting hole.

According to this aspect, a vehicle body structure capable of suppressing intrusion of foreign matters while providing a clearance between the garnish and the cover is provided. The restriction walls suppress air flow that flows between the cover and the annular surface, thereby suppressing intrusion of foreign matters. Since the performance reduction of the radar device due to adhesion of foreign matters is suppressed, traffic safety is improved.

Preferably, the restriction walls are arranged to be spaced from the outer edge portion of the plate-shaped portion, and the restriction walls, the outer edge portion of the plate-shaped portion, the first annular rib, and the annular surface cooperate to form a stagnation chamber (46).

According to this aspect, the stagnation chamber can keep the foreign matters that have passed the first clearance stay therein. Thereby, the foreign matters are prevented from reaching the radar device.

Preferably, a tip of each restriction wall opposes the annular surface via a second clearance (C2), and the first clearance is smaller than the second clearance.

According to this aspect, the restriction wall suppresses air flow that flows between the cover and the annular surface, thereby suppressing intrusion of foreign matters.

Preferably, the cover is made of resin.

According to this aspect, the cover can be radio-transparent.

Preferably, a sealing material (48) is provided in a part of a space between the back side of the plate-shaped portion and the annular surface.

According to this aspect, it is possible to prevent foreign matters from reaching the radar device even more reliably.

Preferably, the garnish includes a second annular rib (51) that is provided along the edge part of the mounting hole and protrudes toward the plate-shaped portion.

According to this aspect, it is possible to prevent foreign matters from reaching the radar device even more reliably.

Preferably, a tip of each restriction wall protrudes into the mounting hole, and a distance between a side surface of each restriction wall and the edge part of the mounting hole is smaller than a distance between the back side of the plate-shaped portion and the annular surface.

According to this aspect, it is possible to prevent foreign matters from reaching the radar device even more reliably.

Preferably, the garnish is a front grille, and an emblem is formed on the plate-shaped portion.

Another aspect of the present invention provides a vehicle body structure (1), comprising: a garnish (2) provided on an outer side of a vehicle; an adapter (7) joined to the garnish; a radar device (4) supported by the adapter; and a cover (8) joined to the garnish and covering the radar device, wherein the garnish comprises: an outer surface; a mounting hole (11) penetrating therethrough from the outer surface to an inner surface; a first annular rib (12) protruding from the outer surface and extending to surround the mounting hole; and an annular surface (13) defined in the outer surface by an edge part of the mounting hole and the first annular rib, wherein the adapter is joined to a back side of the garnish and is disposed in a position corresponding to the mounting hole, wherein the radar device is disposed in a position corresponding to the mounting hole, wherein the cover comprises a plate-shaped portion (37) opposing the mounting hole and the annular surface, wherein one of the plate-shaped portion and the annular surface is provided with an annular restriction wall (71) extending to surround the mounting hole, and wherein an other of the plate-shaped portion and the annular surface is provided with an annular recess (72) for receiving a tip (71A) of the restriction wall.

According to this aspect, a vehicle body structure capable of suppressing intrusion of foreign matters while providing a clearance between the garnish and the cover is provided. The restriction wall suppresses air flow that flows between the cover and the annular surface, thereby suppressing intrusion of foreign matters. Since the performance reduction of the radar device due to adhesion of foreign matters is suppressed, traffic safety is improved.

Preferably, a sealing material (75) is interposed between the tip of the restriction wall and the recess.

According to this aspect, it is possible to prevent foreign matters from reaching the radar device even more reliably.

According to the foregoing configuration, it is possible to provide a vehicle body structure capable of suppressing intrusion of foreign matters while providing a clearance between the garnish and the cover.

BRIEF DESCRIPTION OF THE DRAWINGS

FIG. 2 is a perspective view of a radar mounting part;

DETAILED DESCRIPTION OF THE INVENTION

In the following, embodiments of a vehicle body structure according to the present invention will be described with reference to the drawings. In the following embodiments, description will be made of an example in which the vehicle body structure is applied to a passenger car.

First Embodiment

Figure 1:
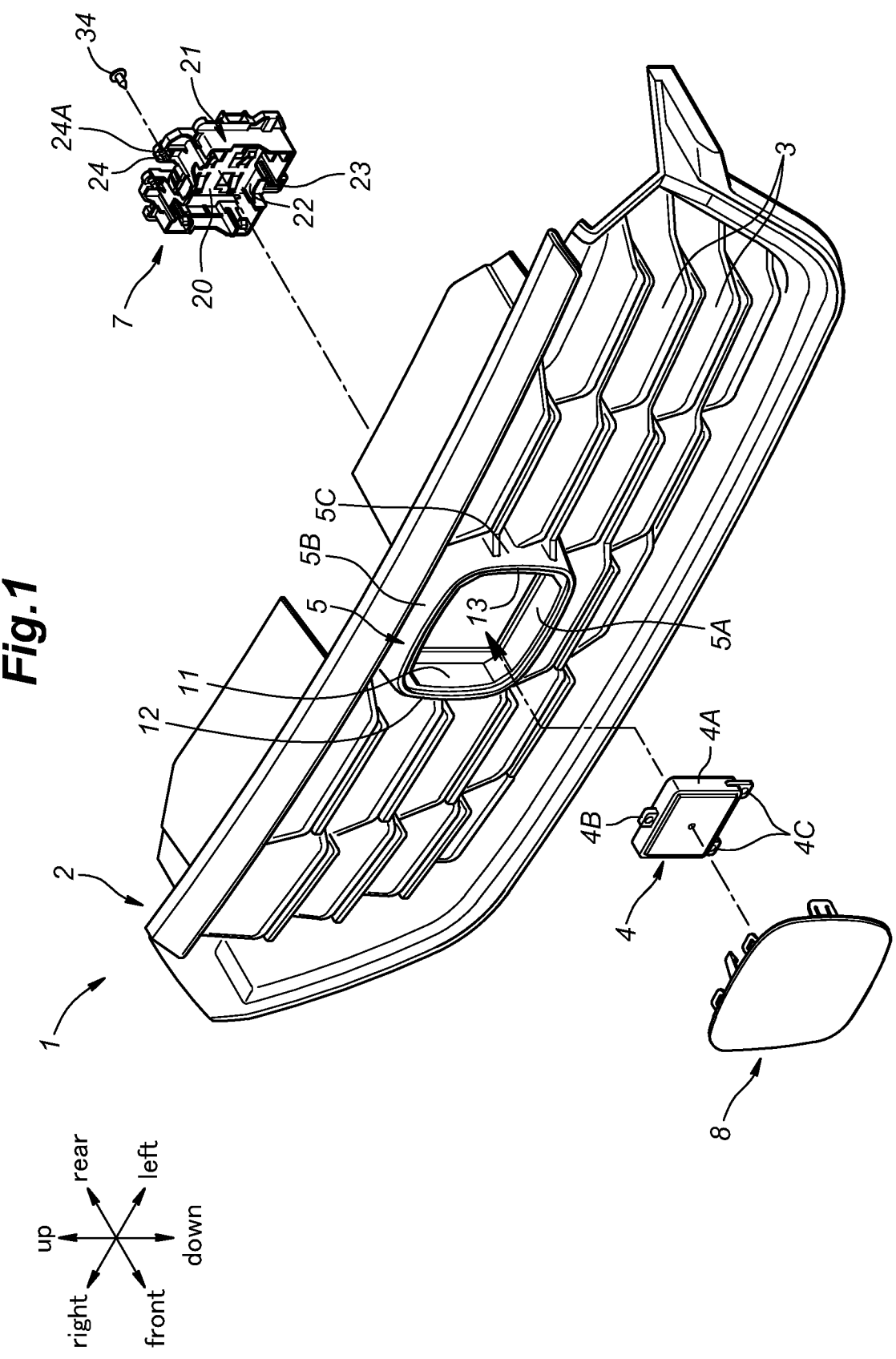
FIG. 1 is a perspective view of a vehicle body structure according to the first embodiment of the present invention.

As shown in FIG. 1, a vehicle body structure 1 of a vehicle, which is a four wheel vehicle, includes a front grille 2 as a garnish in a front portion of the vehicle. The front grille 2 is provided on an outer side of the vehicle and constitutes a part of an exterior of the vehicle. The front grille 2 extends laterally and vertically. The front grille 2 is positioned in a laterally central part of the front portion of the vehicle. The front grille 2 is preferably joined to the front bumper face forming an outer shell of the vehicle or left and right headlights. The front grille 2 is preferably made of a resin material.

The front grille 2 includes multiple openings 3 penetrating therethrough in the front-rear direction. The front grille 2 is provided, at a laterally central part thereof, with a radar mounting part 5 for mounting a radar device 4. The radar mounting part 5 also functions as an emblem mounting part for mounting an emblem of the vehicle. An adapter 7 is joined to the radar mounting part 5, and the radar device 4 is supported on the adapter 7. A cover 8 for covering the radar device 4 is joined to the radar mounting part 5. The emblem may be formed on a surface of the cover 8. The radar mounting part 5, the adapter 7, and the cover 8 are made of resin. The cover 8 is preferably made of polypropylene, for example.

The radar device 4 emits radio waves and receives radio waves reflected from objects around the vehicle, thereby to detect the objects around the vehicle and to measure the distance and direction of each object, namely, the position of each object relative to the radar device 4. The radio waves emitted from the radar device 4 preferably include millimeter waves or microwaves. The radar device 4 includes a case 4A which has a flat rectangular cuboid shape. The radar device 4 transmits and receives radio waves from and through the main surface of the case 4A. In the present embodiment, the radar device 4 is supported on the radar mounting part 5 such that the main surface faces forward. The case 4A is provided with an upper connection piece 4B that protrudes from an upper portion thereof and a pair of lower the connection pieces 4C that protrude from a lower portion thereof.

As shown in FIGS. 1 and 2, the radar mounting part 5 is formed in a tube shape such that the axis thereof extends in the front-rear direction. In the present embodiment, the radar mounting part 5 is formed in a rectangular tube shape. A mounting hole 11 defined inside the radar mounting part 5 penetrates through the front grille 2 from the outer surface to the inner surface of the front grille 2. The radar mounting part 5 has a lower wall portion 5A defining a lower portion of the mounting hole 11, an upper wall portion 5B defining an upper portion of the mounting hole 11, and left and right side wall portions 5C defining left and right side portions of the mounting hole 11.

The front end surface of the radar mounting part 5 is formed annularly along the mounting hole 11. The front end surface of the radar mounting part 5 is provided with a first annular rib 12 which protrudes forward and extends to surround the mounting hole 11. The first annular rib 12 is disposed on an outer circumference side of the front end surface of the radar mounting part 5. Thereby, an annular surface 13 is defined on an inner circumference side of the front end surface of the radar mounting part 5 by the edge part of the mounting hole 11 and the first annular rib 12.

Figure 3:
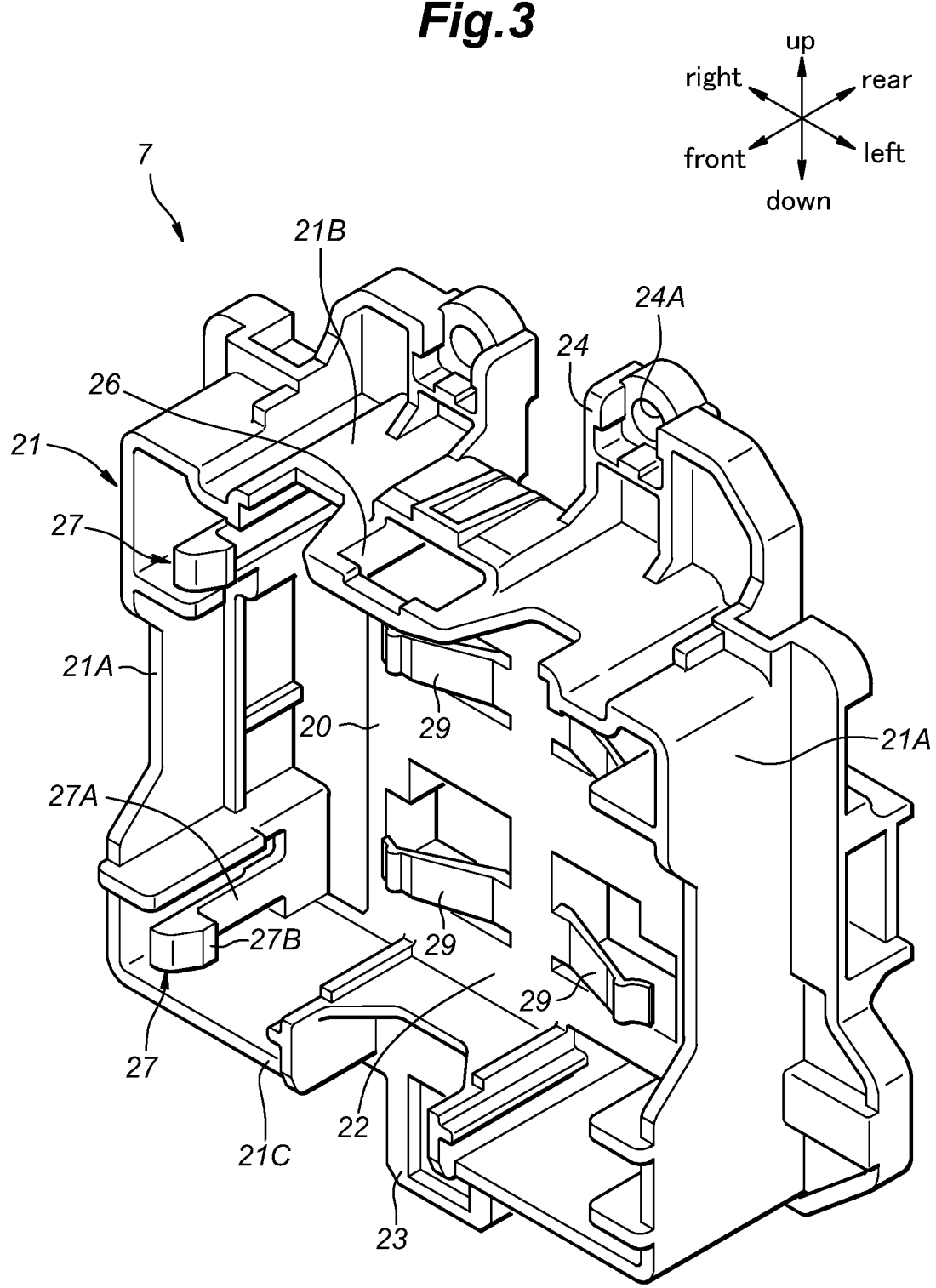
FIG. 3 is a perspective view of an adapter.
Figure 4:
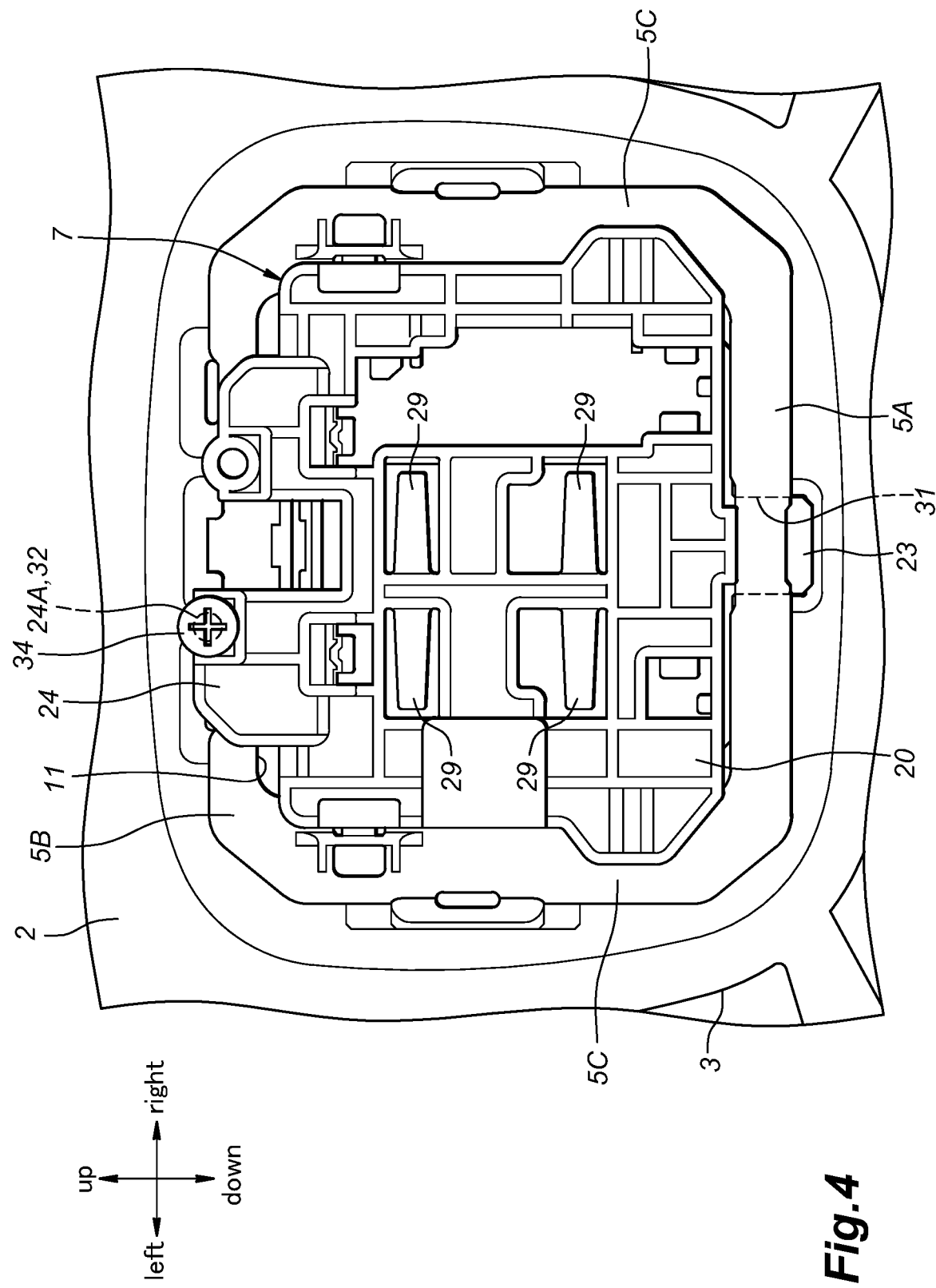
FIG. 4 is a rear view of the radar mounting part and the adapter.
Figure 5:
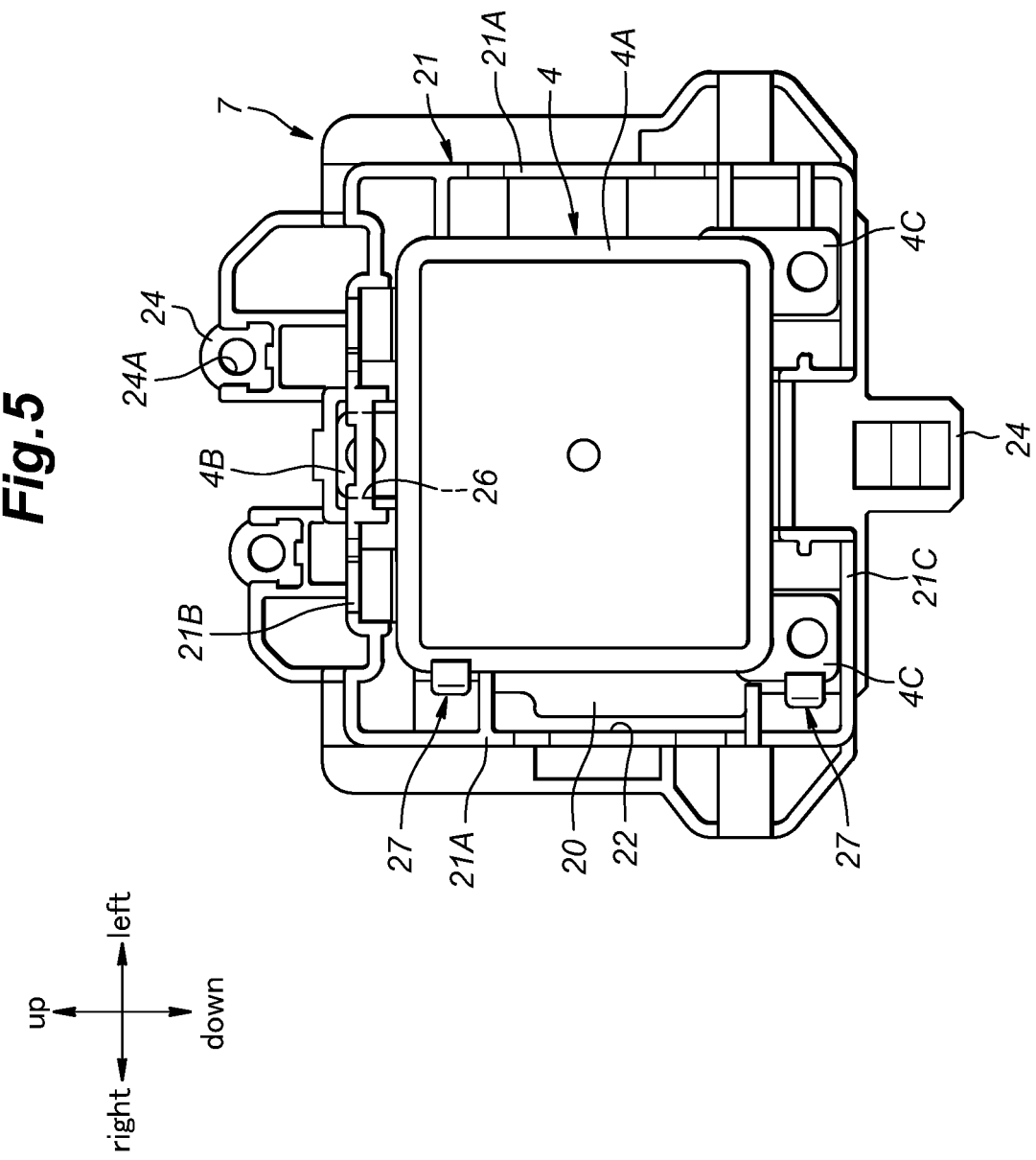
FIG. 5 is a front view of the adapter and a radar device.

As shown in FIGS. 3 to 5, the adapter 7 is joined to the back side of the radar mounting part 5 of the front grille 2 and is disposed in a position opposing the mounting hole 11. The adapter 7 includes a plate-shaped base portion 20 having surfaces facing forward and backward, and an edge wall portion 21 protruding forward from an edge part of the base portion 20 and extending along the edge part. The base portion 20 and the edge wall portion 21 cooperate to form a receiving recess 22 for receiving the radar device 4. The base portion 20 is formed in a substantially quadrilateral shape, as seen from the front. The edge wall portion 21 includes a pair of left and right side edge walls 21A extending vertically along the left and right side edges of the base portion 20, an upper edge wall 21B extending laterally along the upper edge of the base portion 20 and joined to the upper ends of the left and right side edge walls 21A, and a lower edge wall 21C extending laterally along the lower edge of the base portion 20 and joined to the lower ends of the left and right side edge walls 21A.

The lower end the base portion 20 is provided with a connection piece 23 that protrudes downward. The upper end of the base portion 20 is provided with a fastening piece 24 that protrudes upward. The fastening piece 24 is formed with a fastening hole 24A penetrating therethrough in the front-rear direction.

The upper edge wall 21B is formed with a locking hole 26 penetrating vertically therethrough. The front surface of the base portion 20 forming the receiving recess 22 is provided with multiple locking portions 27. Each locking portion 27 is preferably constituted of an elastic claw. Each locking portion 27 includes a cantilever beam 27A having flexibility and extending forward from the base portion 20 and a check claw 27B protruding laterally from the tip of the cantilever beam 27A. Each check claw 27B has a check surface facing the base portion 20. The base portion 20 is provided with multiple spring pieces 29 protruding into the receiving recess 22.

As shown in FIG. 4, the rear end of the lower wall portion 5A of the radar mounting part 5 is provided with a joint hole 31 for receiving the connection piece 23 of the adapter 7. The joint hole 31 penetrates vertically through the lower wall portion 5A. The rear end of the upper wall portion 5B of the radar mounting part 5 is formed with a threaded hole 32 that is recessed forward.

With the connection piece 23 inserted in the joint hole 31 and the fastening piece 24 fastened to the rear end of the upper wall portion 5B of the radar mounting part 5 by a screw 34, the adapter 7 is joined to the radar mounting part 5. The screw 34 passes through the fastening hole 24A of the fastening piece 24 and is threadingly engaged with the threaded hole 32 of the rear end portion of the radar mounting part 5. In the state in which the adapter 7 is joined to the radar mounting part 5, the adapter 7 is disposed in a position corresponding to the mounting hole 11. The edge wall portion 21 and the receiving recess 22 of the adapter 7 are disposed inside the radar mounting part 5, namely, in the mounting hole 11. The front end of the edge wall portion 21 is disposed more rearward than the annular surface 13 of the radar mounting part 5.

As shown in FIG. 5, the radar device 4 is fitted into the receiving recess 22 of the adapter 7. With the upper connection piece 4B of the radar device 4 inserted in the locking hole 26 of the upper edge wall 21B and the case 4A and the pair of lower connection pieces 4C locked by the multiple locking portions 27, the radar device 4 is supported in the receiving recess 22. In the state in which the radar device 4 is supported by the adapter 7, the multiple spring pieces 29 urge the case 4A of the radar device 4 forward. Thereby, rattling of the radar device 4 relative to the adapter 7 is suppressed. In the state in which the adapter 7 is joined to the radar mounting part 5, the radar device 4 is preferably fitted in the adapter 7 through the mounting hole 11 of the radar mounting part 5. The radar device 4 is disposed in a position corresponding to the mounting hole 11. Specifically, the radar device 4 is disposed inside the mounting hole 11. The front surface of the case 4A of the radar device 4 is disposed more rearward than the annular surface 13.

Figure 6:
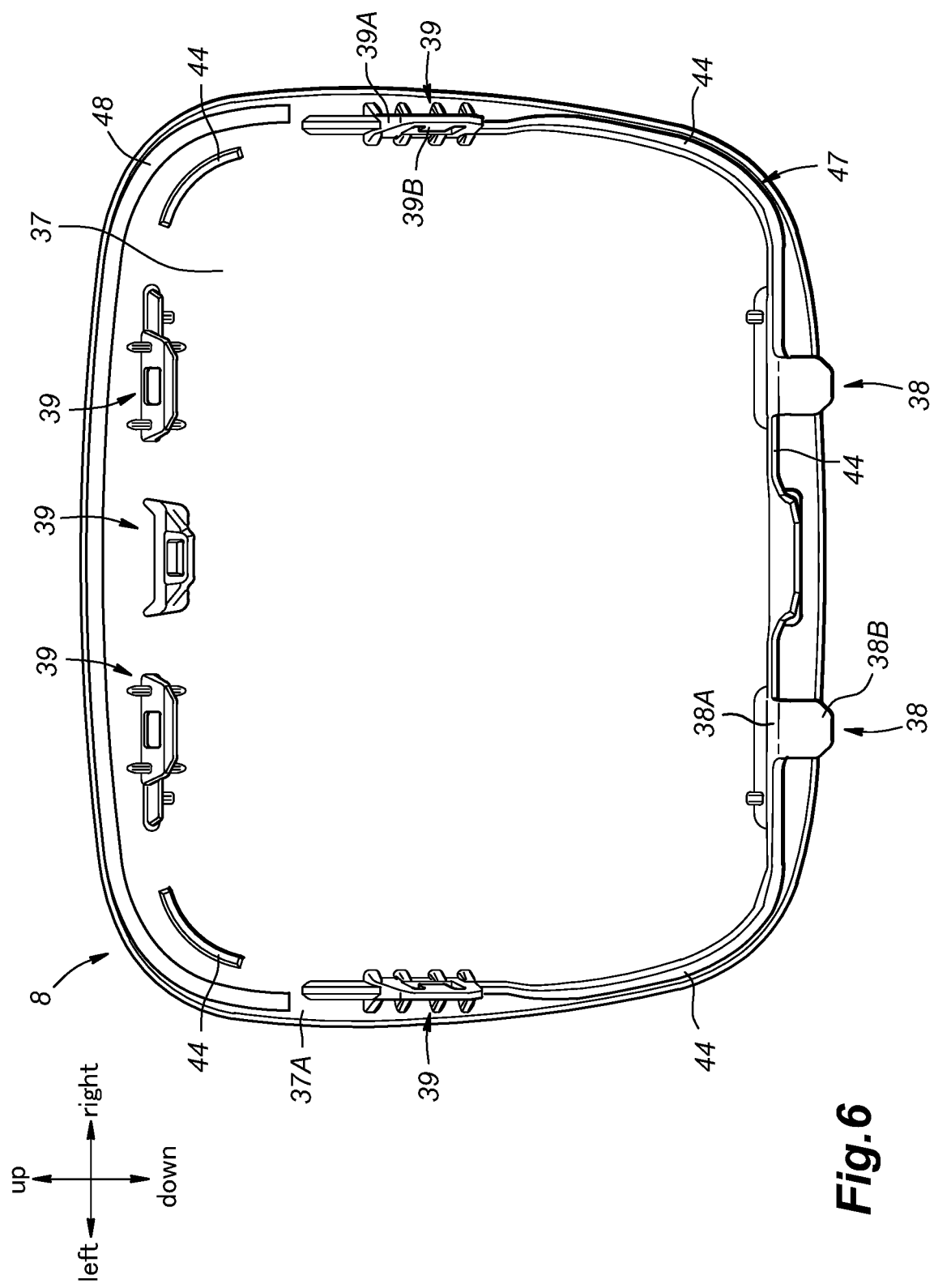
FIG. 6 is a rear view of a cover.
Figure 7:
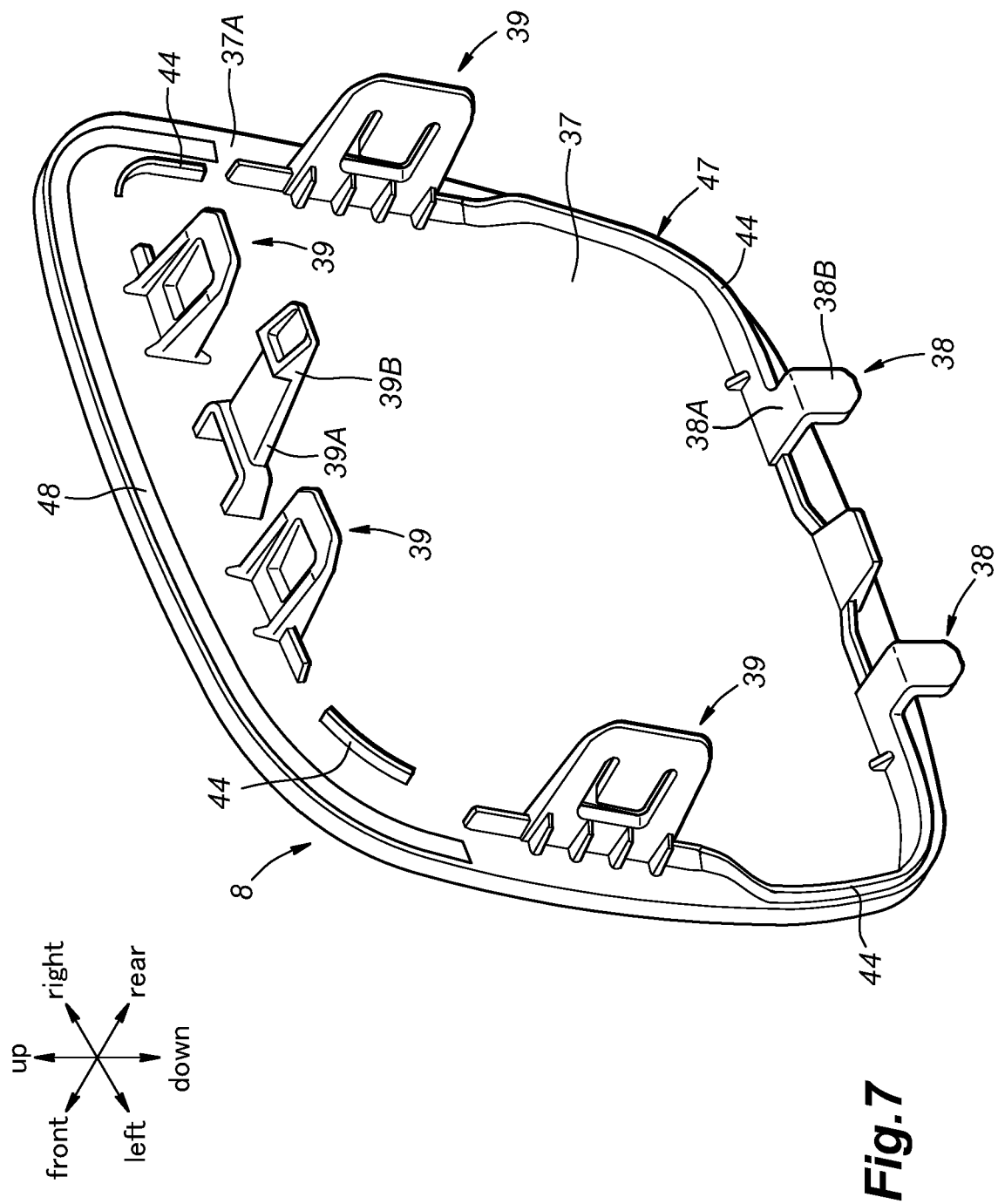
FIG. 7 is a rear perspective view of the cover.

The cover 8 is joined to the front end of the radar mounting part 5 and covers the mounting hole 11. The cover 8 hides the radar device 4 and the adapter 7. As shown in FIGS. 6 and 7, the cover 8 includes a plate-shaped portion 37 having surfaces facing forward and rearward and multiple locking claws 38, 39 protruding from the back side of the plate-shaped portion 37 toward the mounting hole 11 to be engaged with the edge part of the mounting hole 11. The plate-shaped portion 37 is disposed inside the first annular rib 12.

The multiple locking claws 38, 39 include at least one lower locking claw 38 provided in a lower part of the plate-shaped portion 37 and at least one upper locking claw 39 provided in an upper part of the plate-shaped portion 37. In the present embodiment, the locking claws 38, 39 include two lower locking claws 38 and five upper locking claws 39.

Each lower locking claw 38 includes a base portion 38A that protrudes rearward and a tip end portion 38B extending downward from the rear end of the base portion 38A. The base portion 38A extends in the lateral direction. Each upper locking claw 39 includes a plate-shaped base portion 39A that extends rearward and an elastic claw portion 39B that protrudes from the base portion 39A horizontally relative to the base portion 39A. The elastic claw portion 39B has flexibility and can be displaced relative to the base portion 38A.

As shown in FIG. 2, the lower wall portion 5A of the radar mounting part 5 is formed with at least one lower locking hole 41 corresponding to the at least one lower locking claw 38. Each lower locking hole 41 penetrates vertically through the lower wall portion 5A. Each lower locking hole 41 receives the tip end portion 38B of the corresponding lower locking claw 38.

The upper wall portion 5B and the left and right side wall portions 5C of the radar mounting part 5 are formed with at least one upper locking hole 42 corresponding to the at least one upper locking claw 39. Each upper locking hole 42 formed in the upper wall portion 5B penetrates vertically through the upper wall portion 5B. Also, each upper locking hole 42 formed in the left and right side wall portions 5C penetrates laterally through the side wall portion 5C.

Figure 8:
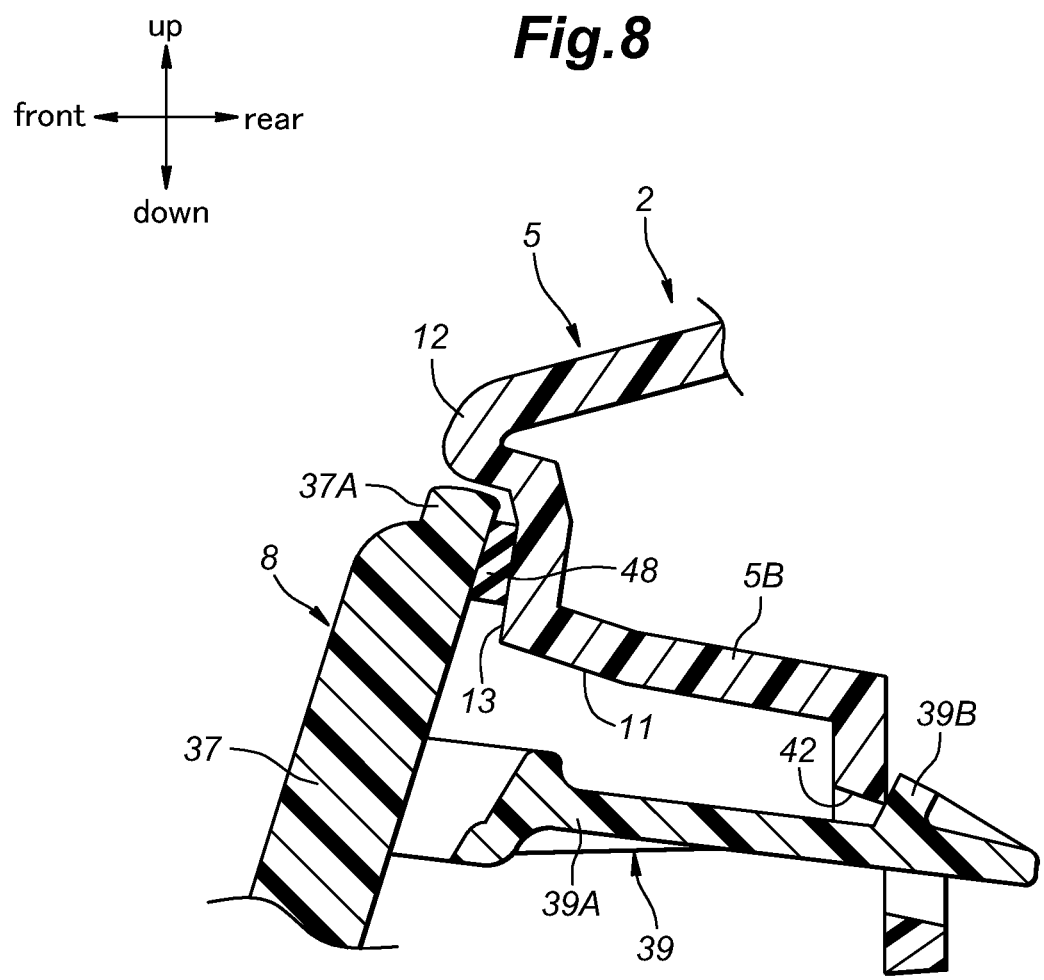
FIG. 8 is a vertical sectional view of a coupling part between the cover and the radar mounting part.
Figure 9:
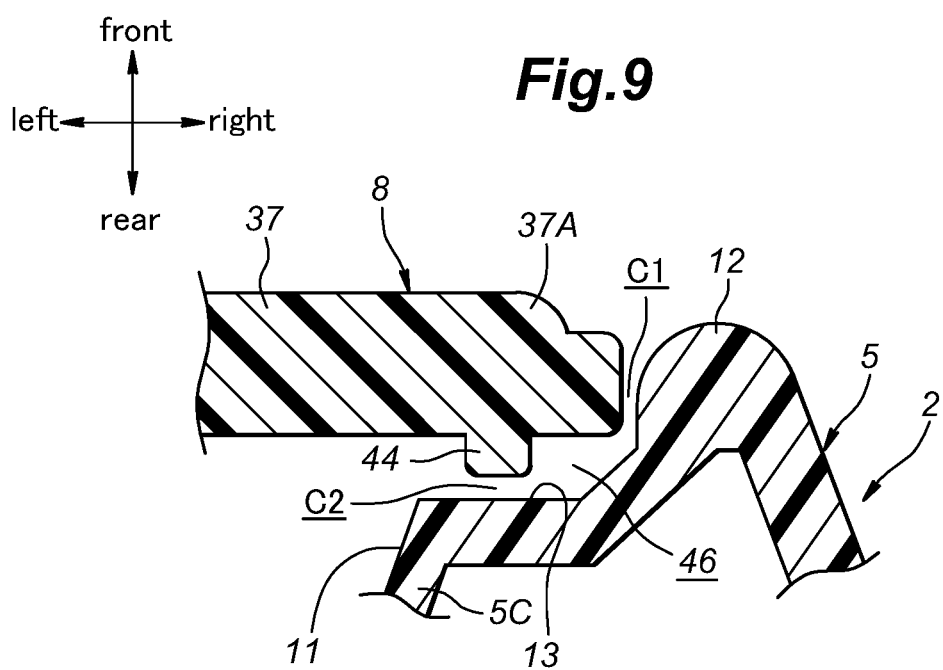
FIG. 9 is a horizontal sectional view of the coupling part between the cover and the radar mounting part.

As shown in FIG. 8, with each lower locking claw 38 inserted in the corresponding lower locking hole 41 and the elastic claw portion 39B of each upper locking claw 39 locked in the corresponding upper locking hole 42, the cover 8 is joined to the radar mounting part 5. As shown in FIG. 9, in the state in which the cover 8 is joined to the radar mounting part 5, an outer edge portion 37A of the plate-shaped portion 37 opposes the inner side surface of the first annular rib 12 via a first clearance C1. The first clearance C1 is formed over the entire circumference of the outer edge portion 37A of the plate-shaped portion 37. Also, the outer edge portion 37A on the back side of the plate-shaped portion 37 opposes the annular surface 13. Namely, as seen from the front, the outer edge portion 37A of the plate-shaped portion 37 has an overlap with the annular surface 13.

As shown in FIGS. 6 and 7, the cover 8 includes multiple restriction walls 44 protruding from the back side of the plate-shaped portion 37 toward the annular surface 13. As shown in FIG. 9, the tip of each restriction wall 44 opposes the annular surface 13 via a second clearance C2. Preferably, the first clearance C1 is smaller than the second clearance C2.

Preferably, each restriction wall 44 is spaced from the outer edge portion 37A of the plate-shaped portion 37. Thereby, the restriction walls 44, the outer edge portion 37A of the plate-shaped portion 37, the first annular rib 12, and the annular surface 13 can cooperate to form a stagnation chamber 46. The stagnation chamber 46 is preferably formed annularly along the annular surface 13.

The multiple restriction walls 44 preferably extend along the annular surface 13. Some of the multiple restriction walls 44 preferably extend to connect adjoining lower locking claws 38 to each other. Also, some of the multiple restriction walls 44 preferably extend to connect adjoining lower locking claws 38 and some of the upper locking claws 39. In the present embodiment, the two lower locking claws 38 and the left and right upper locking claws 39 provided on the side portions of the plate-shaped portion 37 are connected by the multiple restriction walls 44 and form a continuous wall 47. The continuous wall 47 extends laterally on the lower portion of the plate-shaped portion 37 and has left and right ends extending upward. Also, some of the multiple restriction walls 44 may be disposed between adjoining upper locking claws 39 via spaces. The multiple restriction walls 44 may extend annularly along the annular surface 13. Also, the multiple restriction walls 44 may cooperate with the multiple upper locking claws 39 and the multiple lower locking claws 38 to form a continuous annular wall. Also, an annular restriction wall 44 may be formed and the multiple upper locking claws 39 and the multiple lower locking claws 38 may be disposed inside the restriction wall 44.

A sealing material 48 may be provided in a part of a space between the back side of the plate-shaped portion 37 and the annular surface 13. As shown in FIG. 8, the sealing material 48 contacts the back side of the plate-shaped portion 37 and the annular surface 13 to fill the gap between the back side of the plate-shaped portion 37 and the annular surface 13. In the present embodiment, the sealing material 48 extends laterally along the upper edge of the back side of the plate-shaped portion 37. Preferably, the sealing material 48 is made of foamed material such as foamed rubber, for example. The sealing material 48 is disposed closer to the edge of the plate-shaped portion 37 than the upper locking claws 39 and the restriction walls 44 are. Preferably, the left and right end portions of the sealing material 48 extend downward. The left and right end portions of the sealing material 48 may be connected to corresponding end portions of the continuous wall 47. Preferably, the sealing material 48 is adhered to the back side of the plate-shaped portion 37.

In the vehicle body structure 1 according to the first embodiment according to described above, the multiple restriction walls 44 suppress the air flow that flows between the cover 8 and the annular surface 13, thereby to suppress intrusion of foreign matters. Thereby, in the vehicle body structure 1, it is possible to suppress intrusion of foreign matters even though the first clearance C1 is provided between the first annular rib 12 and the cover 8. Since the performance reduction of the radar device 4 due to adhesion of foreign matter is suppressed, traffic safety is improved.

The stagnation chamber 46 can keep the foreign matters that have passed the first clearance C1 stay therein. Thereby, the foreign matters are prevented from reaching the radar device 4. Since the first clearance C1 is smaller than the second clearance C2, the restriction walls 44 can effectively suppress the air flow that flows between the cover 8 and the annular surface 13.

Since the cover 8 is made of resin, the cover 8 can be radio-transparent. Thereby, the radar device 4 can emit radio waves to the outside through the cover 8 from behind the back side of the cover 8. The sealing material 48 can prevent the foreign matters from reaching the radar device 4 even more reliably.

Second Embodiment

A vehicle body structure 50 according to the second embodiment differs from the vehicle body structure 1 according to the first embodiment in that the annular surface 13 is provided with a second annular rib 51. In the second embodiment, structures similar to those of the first embodiment will be denoted by the same reference numbers and the description thereof will be omitted.

Figure 10:
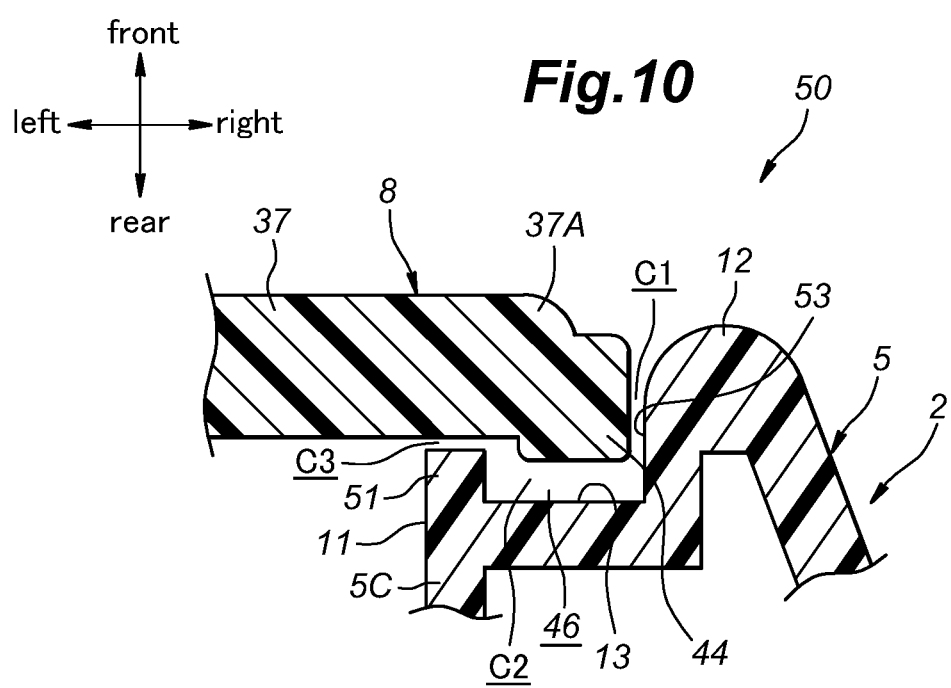
FIG. 10 is a horizontal sectional view of the coupling part between the cover and the radar mounting part according to the second embodiment.

As shown in FIG. 10, in the vehicle body structure 50 according to the second embodiment, the radar mounting part 5 includes a second annular rib 51 provided along the edge part of the mounting hole 11 and protruding toward the plate-shaped portion 37. The second annular rib 51 is formed annularly along the mounting hole 11. The tip of the second annular rib 51 opposes the back side of the plate-shaped portion 37 via a third clearance C3. The second annular rib 51 is disposed closer to the center of the plate-shaped portion 37 than the multiple restriction walls 44 are. The tip of the second annular rib 51 is disposed closer to the back side of the plate-shaped portion 37 than the tip of each restriction wall 44 is. The second annular rib 51 and the multiple restriction walls 44 cooperate to form a labyrinth structure. The labyrinth structure suppresses the air flow that flows between the cover 8 and the annular surface 13, thereby to suppress intrusion of foreign matters. Preferably, the third clearance C3 is smaller than the second clearance C2.

The multiple restriction walls 44 may be provided along the outer edge portion 37A of the plate-shaped portion 37. According to this configuration, a passage 53 defined by the outer edge portion 37A of the plate-shaped portion 37 and the inner surface of the first annular rib 12 can be extended rearward by the restriction walls 44. The passage 53 has a cross-sectional area smaller than that of the stagnation chamber 46 formed between the back side of the plate-shaped portion 37 and the annular surface 13, and therefore, the resistance against the air flow that flows between the radar mounting part 5 and the cover 8 can be increased.

Third Embodiment

A vehicle body structure 60 according to the third embodiment differs from the vehicle body structure 1 according to the first embodiment with respect to the position of the multiple restriction walls 44. In the third embodiment, structures similar to those of the first embodiment will be denoted by the same reference numbers and the description thereof will be omitted.

Figure 11:
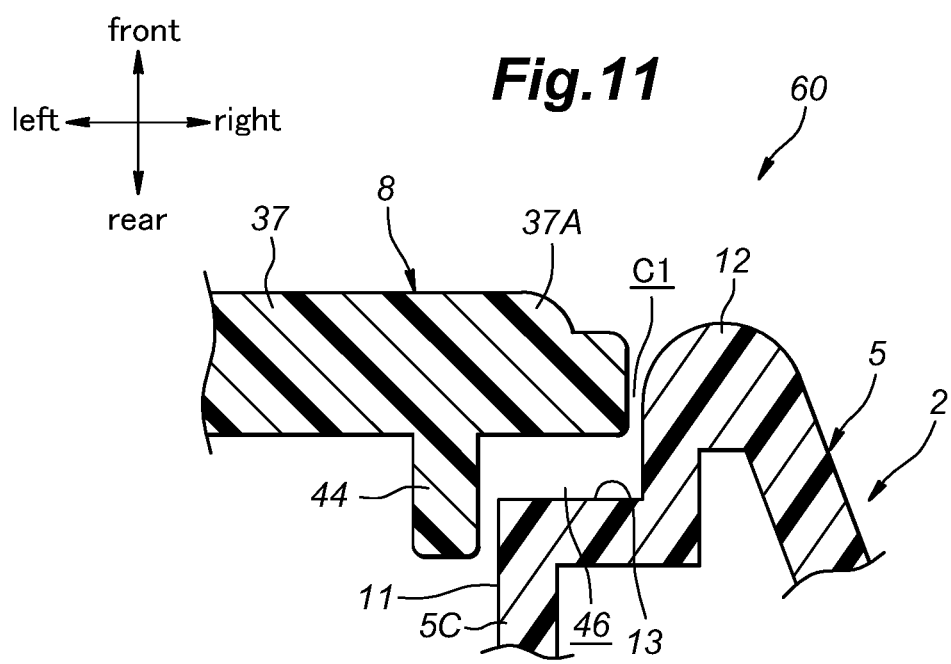
FIG. 11 is a horizontal sectional view of the coupling part between the cover and the radar mounting part according to the third embodiment.

As shown in FIG. 11, in the third embodiment, the multiple restriction walls 44 are disposed at a position opposing the mounting hole 11 as seen from the front. The tips of the multiple restriction walls 44 protrude into the mounting hole 11. Namely, the tips of the multiple restriction walls 44 are positioned more rearward than the annular surface 13. The height of each restriction wall 44 is greater than the distance between the back side of the plate-shaped portion 37 and the annular surface 13. The restriction wall 44 opposes the inner surfaces of the lower wall portion 5A, the upper wall portion 5B, and the side wall portions 5C via a gap. Preferably, the distance between the side surface of the restriction wall 44 and the edge part of the mounting hole 11 is smaller than the distance between the back side of the plate-shaped portion 37 and the annular surface 13.

Fourth Embodiment

A vehicle body structure 70 according to the fourth embodiment differs from the vehicle body structure 1 according to the first embodiment with respect to the structure of a restriction wall 71. In the fourth embodiment, structures similar to those of the first embodiment will be denoted by the same reference numbers and the description thereof will be omitted.

Figure 12:
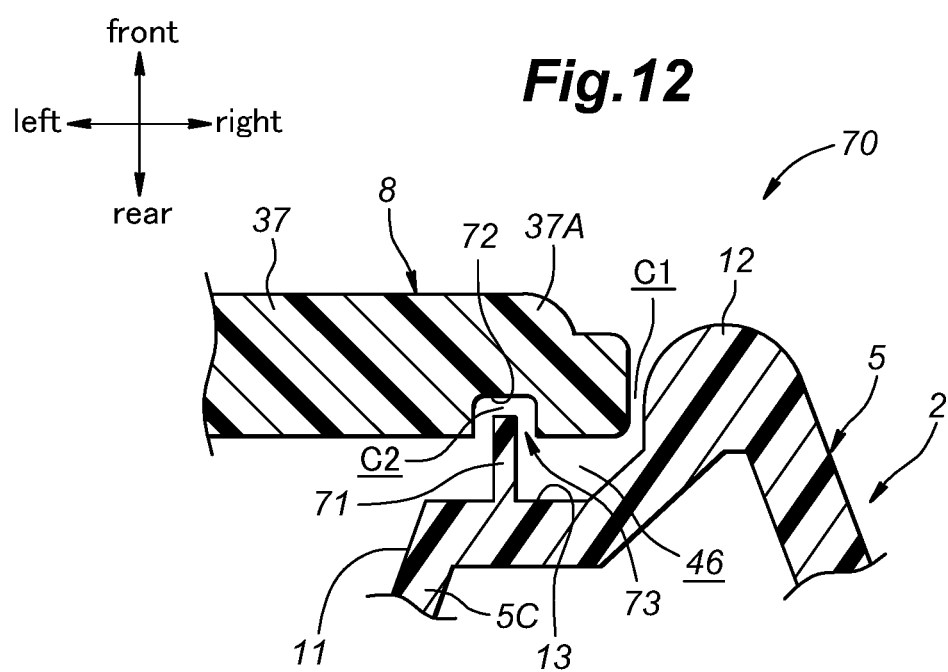
FIG. 12 is a horizontal sectional view of the coupling part between the cover and the radar mounting part according to the fourth embodiment.
Figure 13:
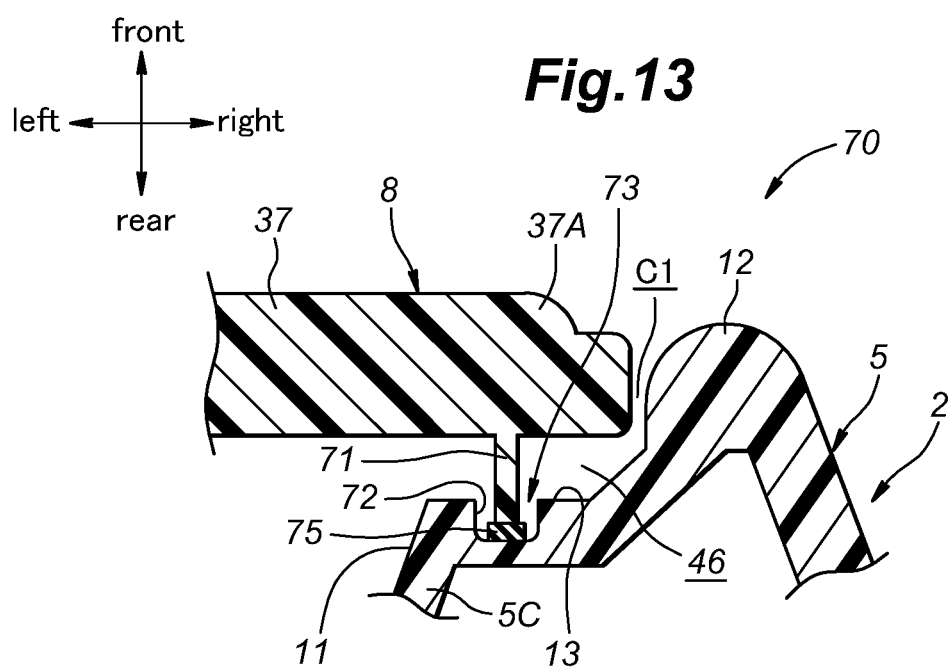
FIG. 13 is a horizontal sectional view of the coupling part between the cover and the radar mounting part according to another example of the fourth embodiment.

As shown in FIGS. 12 and 13, in the fourth embodiment, a restriction wall 71 is provided on one of the plate-shaped portion 37 and the annular surface 13. The restriction wall 71 is formed annularly and extends to surround the mounting hole 11. The other of the plate-shaped portion 37 and the annular surface 13 is provided with an annular recess 72 for receiving the tip of the restriction wall 71. In the example shown in FIG. 12, the restriction wall 71 is provided on the annular surface 13, and the recess 72 is provided on the outer edge portion 37A. The tip of the restriction wall 71 and the recess 72 form a bent flow path. Namely, the tip of the restriction wall 71 and the recess 72 form a labyrinth structure 73. Preferably, the tip of the restriction wall 71 and the recess 72 are arranged via the clearance C2.

The labyrinth structure 73 suppresses the air flow that flows between the cover 8 and the annular surface 13, thereby to suppress intrusion of foreign matters. Accordingly, in the vehicle body structure 70, it is possible to suppress intrusion of foreign matters while providing a gap between the first annular rib 12 and the cover 8. Since the tip of the restriction wall 71 and the recess 72 are not in contact with each other, generation of abnormal noise due to rattling can be suppressed. Also, since the performance reduction of the radar device 4 due to adhesion of foreign matter is suppressed, traffic safety is improved.

In another example shown in FIG. 13, the restriction wall 71 is provided on the outer edge portion 37A, and the recess 72 is provided on the annular surface 13. Also, a sealing material 75 may be interposed between the tip of the restriction wall 71 and the recess 72. Similarly to the sealing material 48, the sealing material 75 is preferably made of a material having flexibility. The sealing material 48 seals between the cover 8 and the annular surface 13 and prevents foreign matters from reaching the radar device 4 even more reliably. Also, the sealing material 75 prevents collision between the tip of the restriction wall 71 and the recess 72, thereby to suppress generation of abnormal noise. Note that the sealing material 75 may fill the clearance C2 of FIG. 12.

Concrete embodiments of the present invention have been described in the foregoing, but the present invention is not limited to the above embodiments and may be modified or altered in various ways. For example, the shape of the radar mounting part 5 may be cylindrical instead of rectangular tubular. the shapes, numbers, and positions of the locking claws 38, 39 for joining the cover 8 to the radar mounting part 5 may be changed as appropriate.

The invention claimed is:

1. A vehicle body structure, comprising:
a garnish provided on an outer side of a vehicle;
an adapter joined to the garnish;
a radar device supported by the adapter; and
a cover joined to the garnish and covering the radar device,
wherein the garnish comprises:
an outer surface;
a mounting hole penetrating from the outer surface to an inner surface;
a first annular rib protruding from the outer surface and extending to surround the mounting hole; and
an annular surface defined in the outer surface by an edge part of the mounting hole and the first annular rib,
wherein the adapter is joined to a back side of the garnish and is disposed in a position corresponding to the mounting hole,
wherein the radar device is disposed in a position corresponding to the mounting hole, and
wherein the cover comprises:
a plate-shaped portion that is disposed inside the first annular rib, has an outer edge portion opposing an inner side surface of the first annular rib via a first clearance, and covers the mounting hole;
multiple restriction walls protruding from a back side of the plate-shaped portion toward the annular surface; and
a locking claw protruding from the back side of the plate-shaped portion toward the mounting hole to be locked by the edge part of the mounting hole.

2. The vehicle body structure according to claim 1, wherein the restriction walls are arranged to be spaced from the outer edge portion of the plate-shaped portion, and
the restriction walls, the outer edge portion of the plate-shaped portion, the first annular rib, and the annular surface cooperate to form a stagnation chamber.

3. The vehicle body structure according to claim 1, wherein a tip of each restriction wall opposes the annular surface via a second clearance, and
the first clearance is smaller than the second clearance.

4. The vehicle body structure according to claim 1, wherein the cover is made of resin.

5. The vehicle body structure according to claim 1, wherein a sealing material is provided in a part of a space between the back side of the plate-shaped portion and the annular surface.

6. The vehicle body structure according to claim 1, wherein the garnish includes a second annular rib that is provided along the edge part of the mounting hole and protrudes toward the plate-shaped portion.

7. The vehicle body structure according to claim 1, wherein a tip of each restriction wall protrudes into the mounting hole, and
a distance between a side surface of each restriction wall and the edge part of the mounting hole is smaller than a distance between the back side of the plate-shaped portion and the annular surface.

8. The vehicle body structure according to claim 1, wherein the garnish is a front grille, and
an emblem is formed on the plate-shaped portion.

* * * * *